Aug. 18, 1925.
W. R. FOX ET AL
METAL WORKING MACHINE
Filed Dec. 27, 1921
1,550,609
9 Sheets-Sheet 6
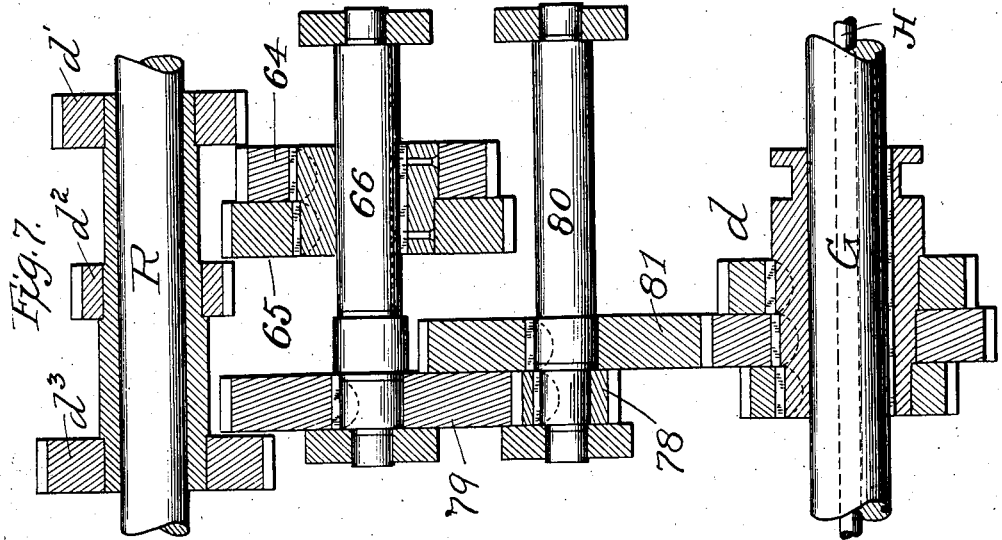
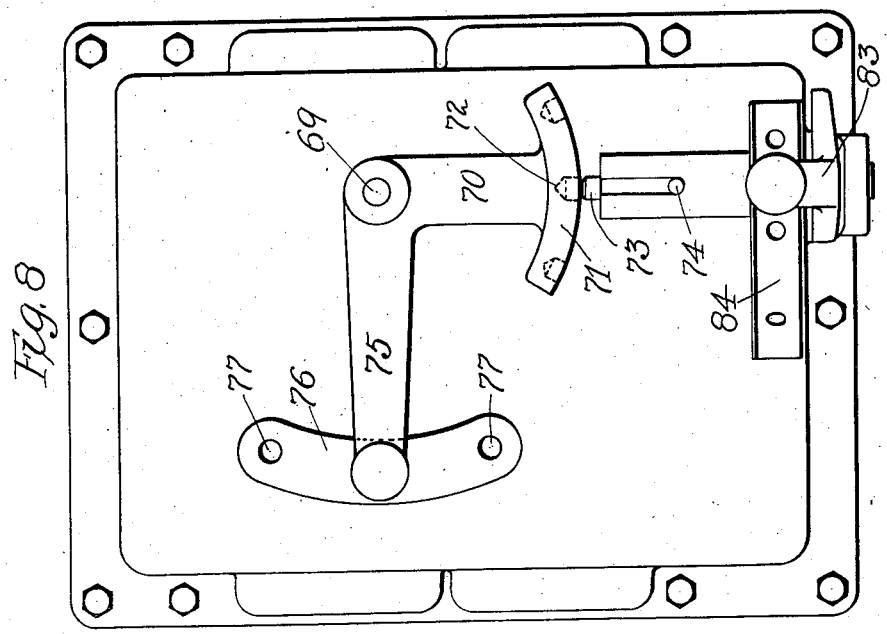
Inventor
William R. Fox
Howard D. Corwin
By Spear, Middleton, Donaldson & Hall
Attorney Aug. 18, 1925.  
W. R. FOX ET AL  
METAL WORKING MACHINE  
Filed Dec. 27, 1921    9 Sheets-Sheet 7
1,550,609
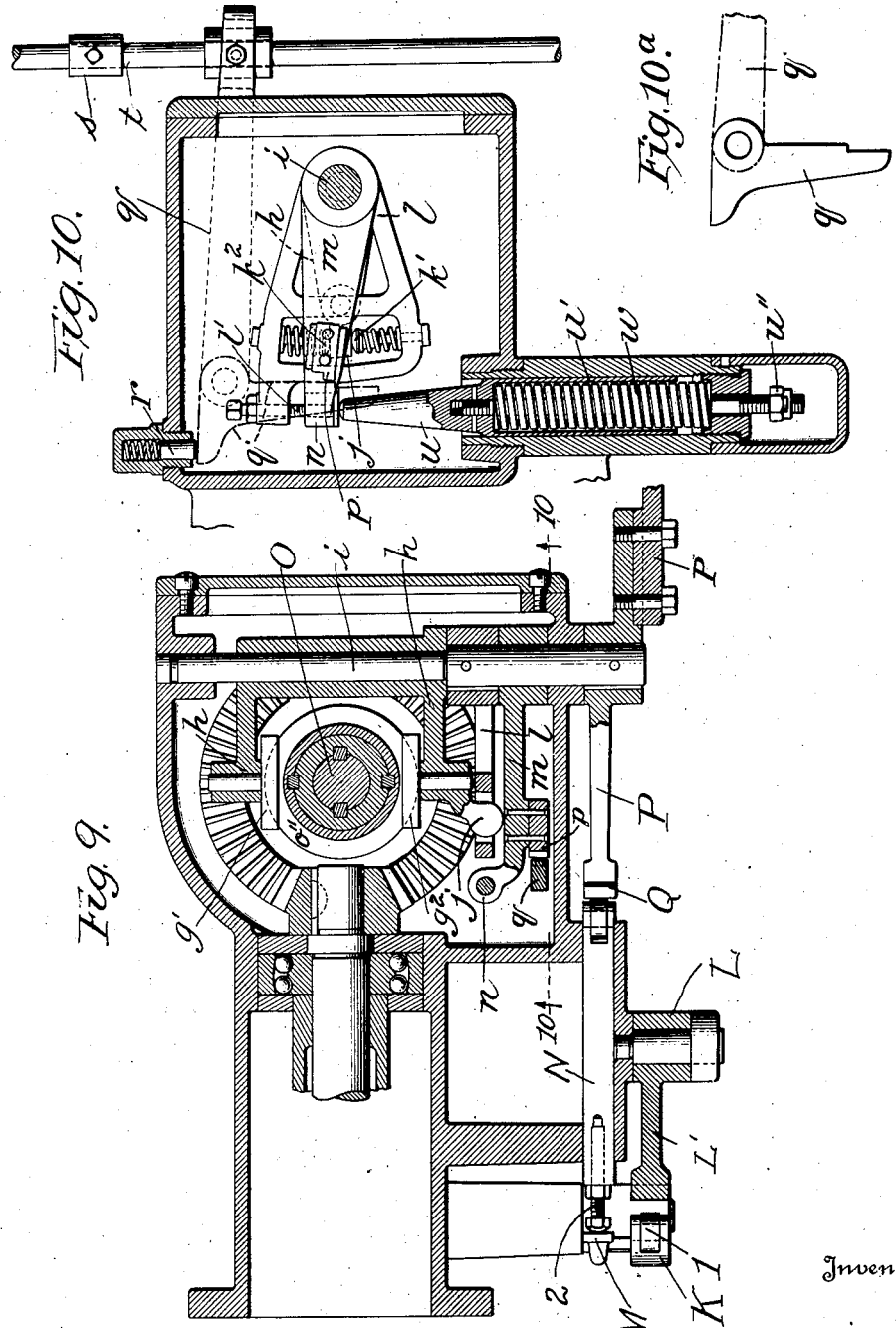

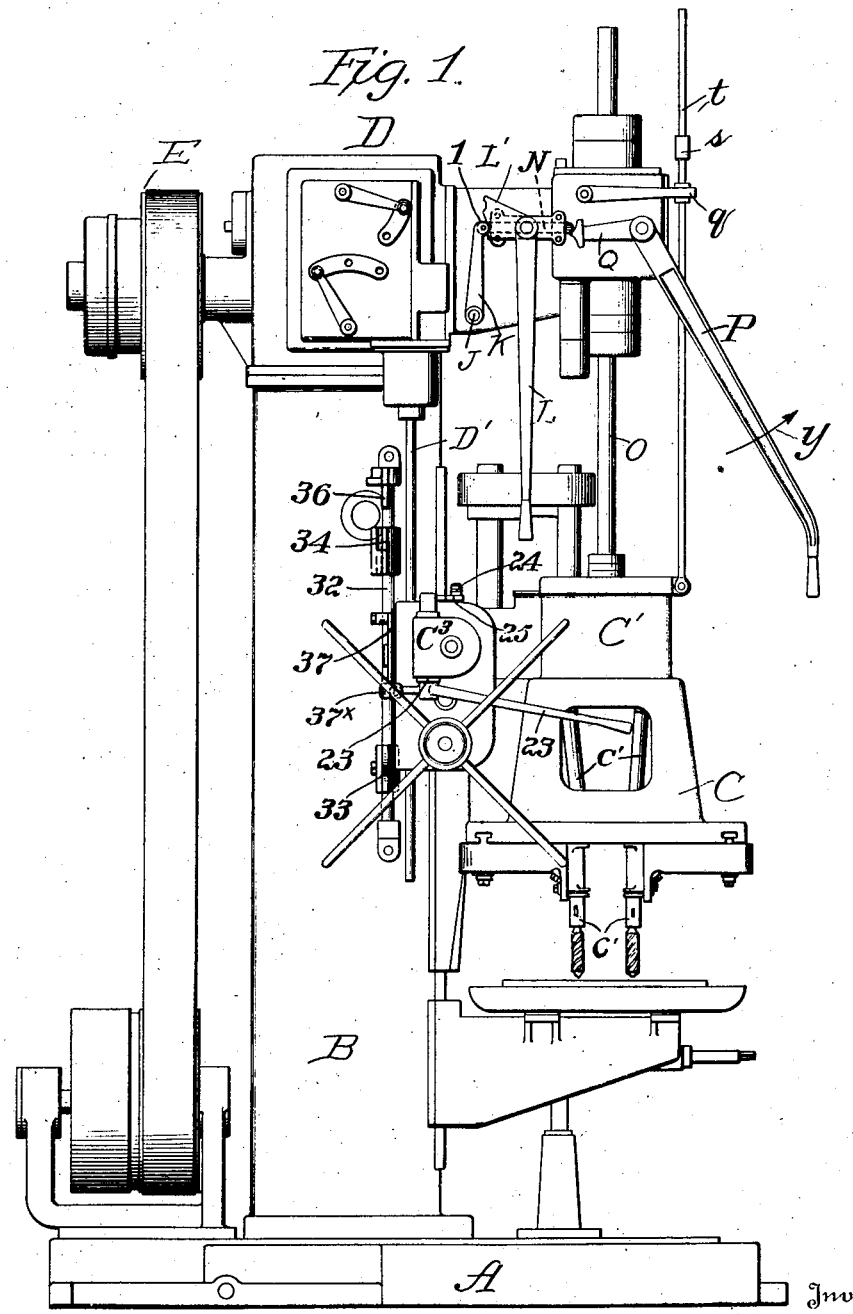

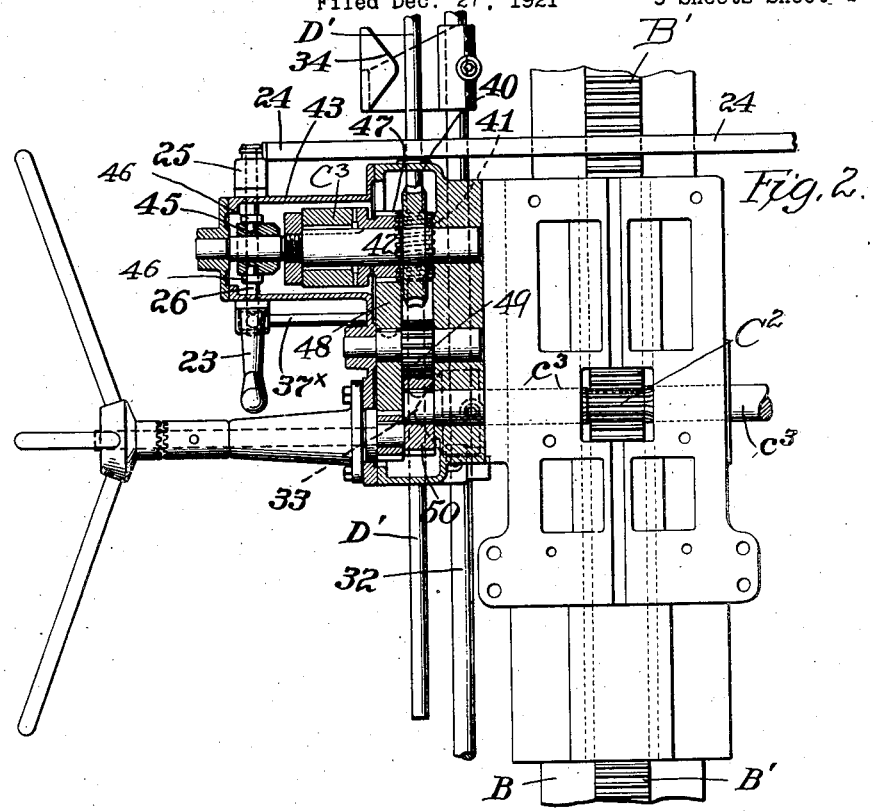
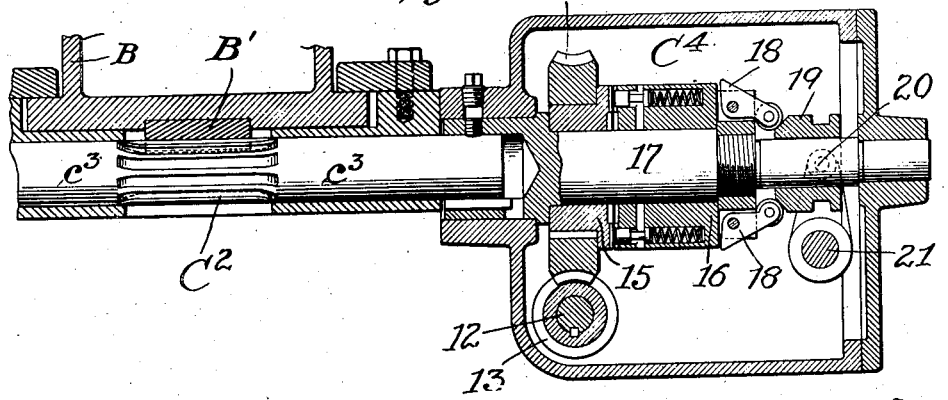

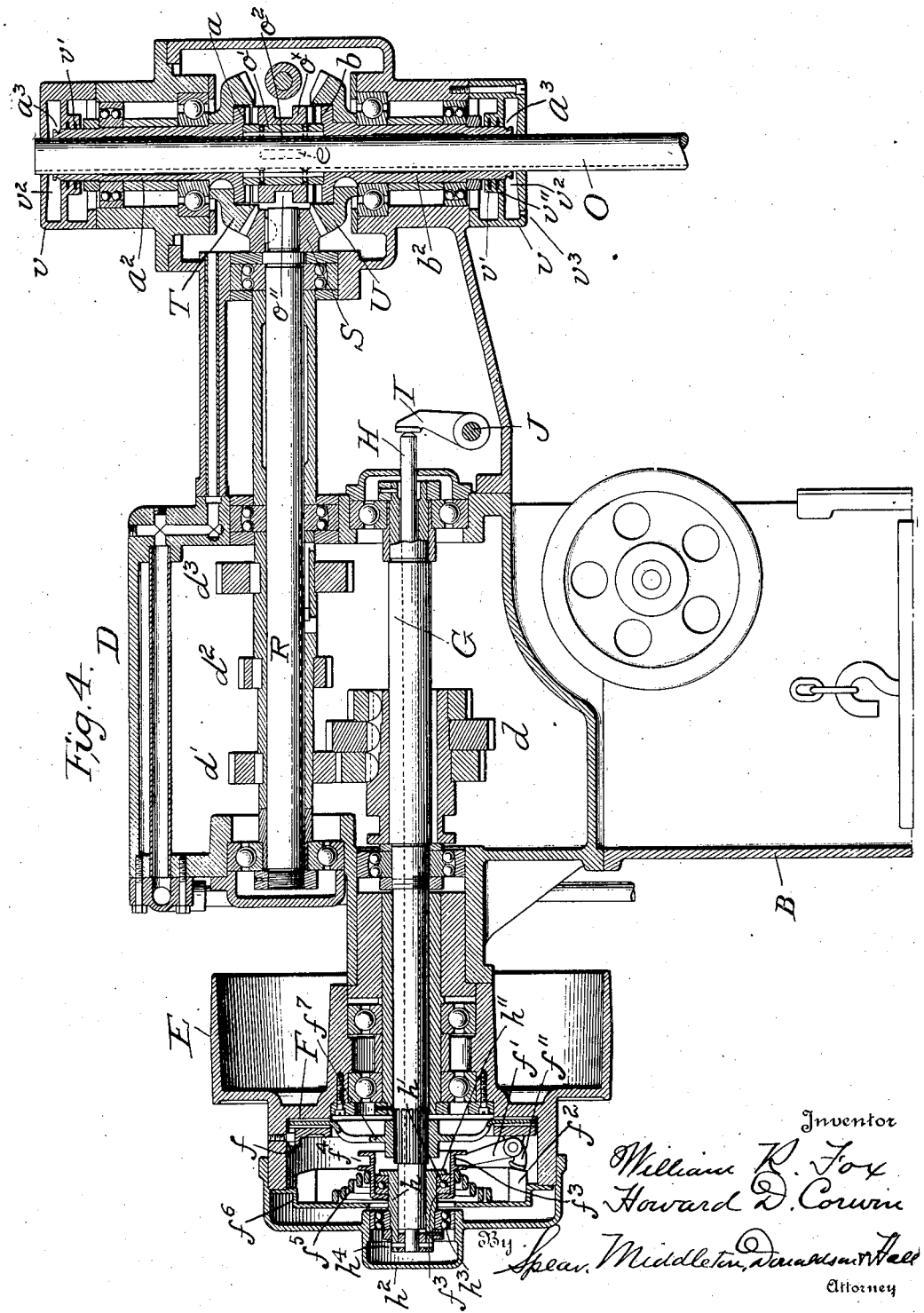

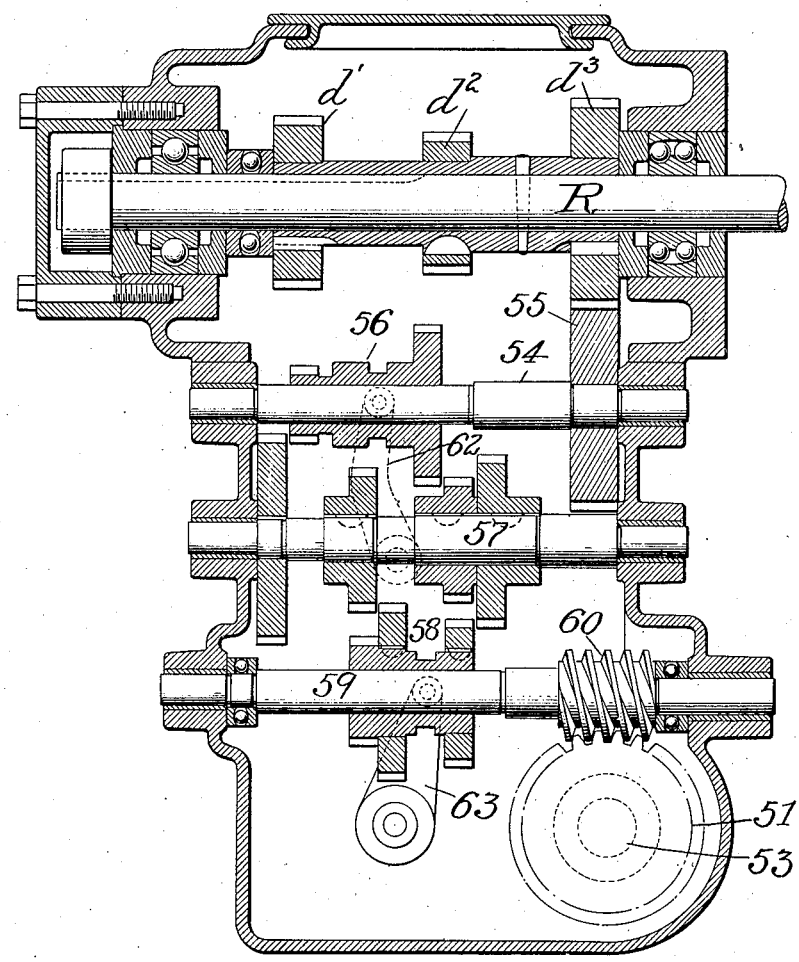

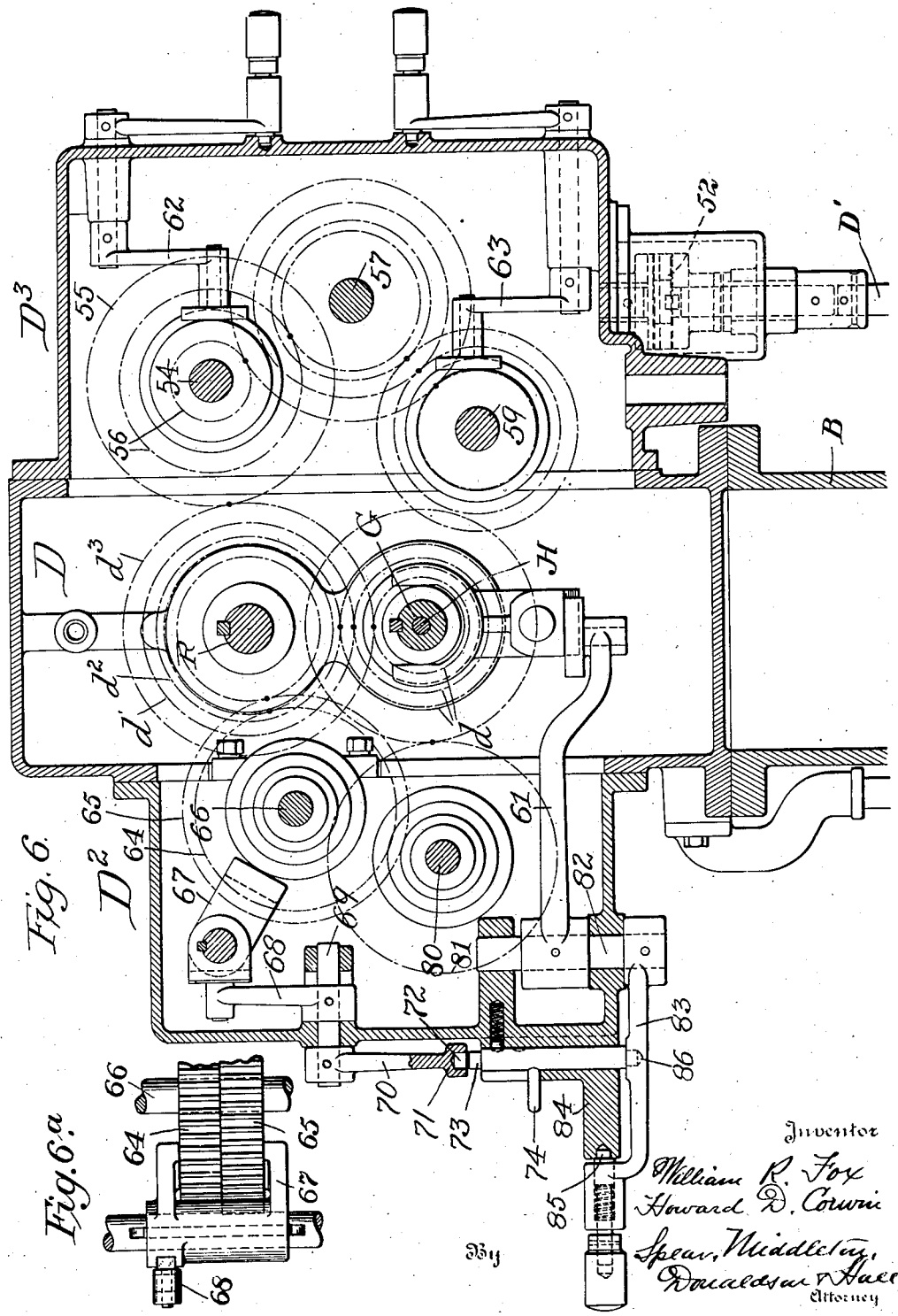

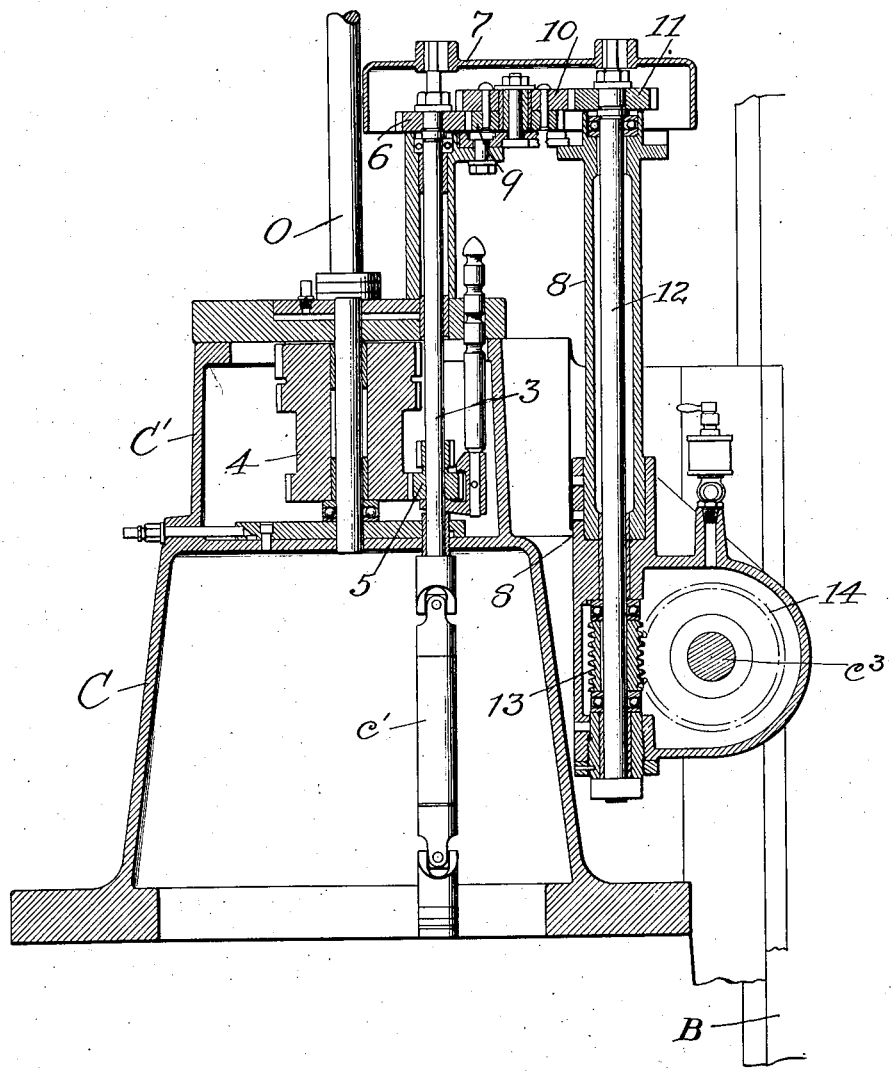

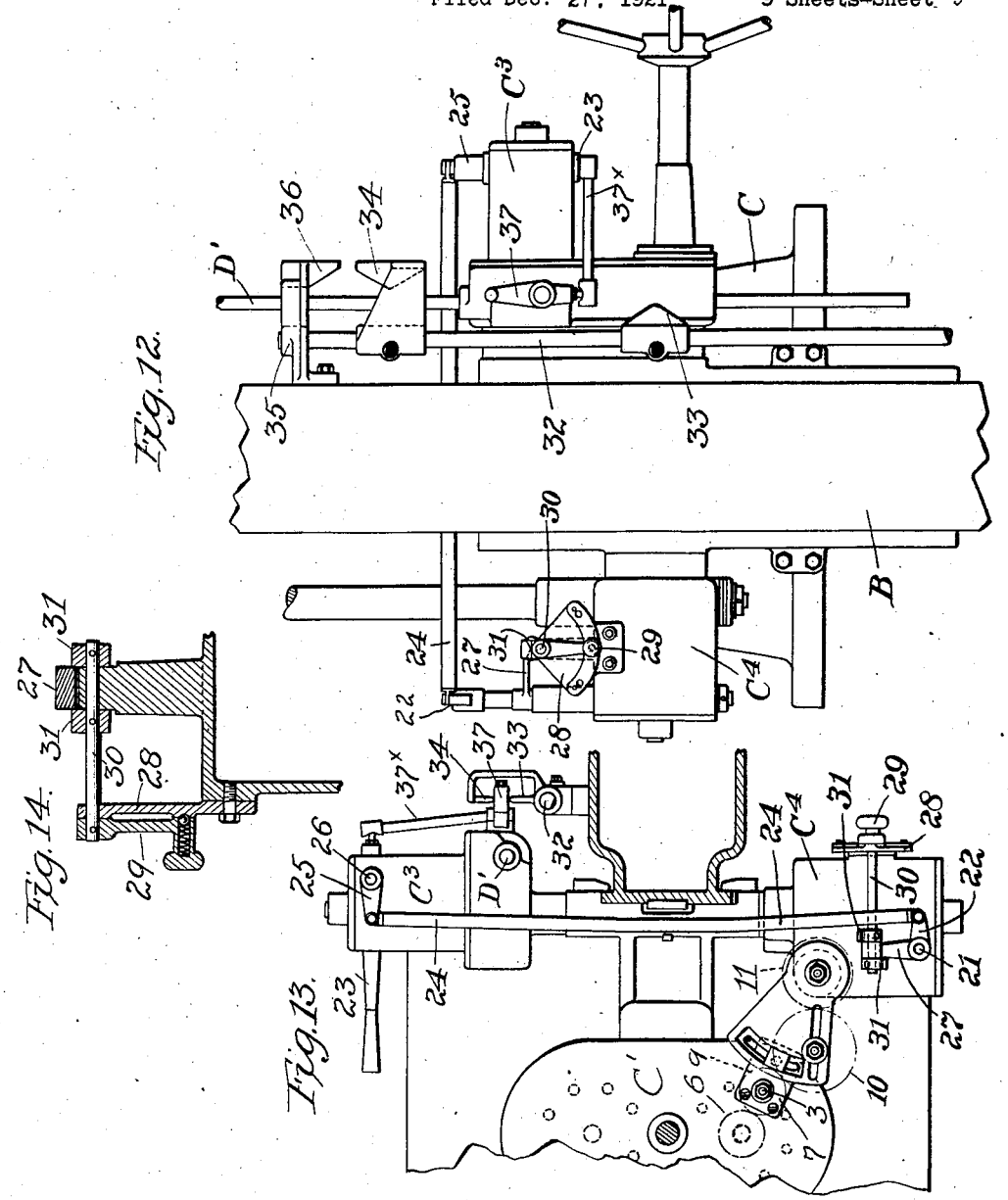

Patented Aug. 18, 1925.

1,550,609

UNITED STATES PATENT OFFICE.

WILLIAM R. FOX AND HOWARD D. CORWIN, OF JACKSON, MICHIGAN, ASSIGNORS TO FOX MACHINE COMPANY, OF JACKSON, MICHIGAN, A CORPORATION OF MICHIGAN.

METAL-WORKING MACHINE.

Application filed December 27, 1921. Serial No. 525,091.

*To all whom it may concern:*

Be it known that we, WILLIAM R. Fox and HOWARD D. CORWIN, citizens of the United States, and residents of Jackson, Michigan, have invented certain new and useful Improvements in Metal-Working Machines, of which the following is a specification.

This invention relates to improvements on multiple spindle drilling machines and particularly to those parts of the machine which have to do with multiple tapping, as well as multiple drilling.

The machine is organized with certain mechanism or groups of mechanisms which are common to both the drilling and the tapping mechanism.

Means are provided whereby when drilling is being done the tapping mechanism will be inactive and on the other hand when tapping is being done certain mechanism belonging to the drilling will be inactive.

The accompanying drawings shown in:

Fig. 1 is a side view of the machine.

Fig. 2 is a front view of the sliding saddle with the tool carrying head removed and with the drill clutch and gearing in section.

Fig. 3 is a sectional view of the tapping clutch and associated parts.

Fig. 4 is a vertical sectional view of the upper part of the machine, showing driving gearing.

Fig. 5 is a sectional view in the nature of a diagram showing certain of the gearing spread out or developed from normal position.

Fig. 6 is a transverse section through the gearing and casing at the head of the machine.

Fig. 6ª is a detail view of a fork for shifting gears.

Fig. 7 is a diagrammatic or developed view of certain of the gearing of Fig. 6, viz. that group of gearing at the left of said figure.

Fig. 8 is a side view of the gear casing looking from the left of Fig. 6.

Fig. 9 is a sectional view of reversing gear mechanism belonging to the tapping organization, and parts associated therewith.

Fig. 10 is a sectional view on line 10—10 of Fig. 9.

Fig. 10ª is a detail view of a trip lever.

Fig. 11 is a sectional view through the gear chest of the drilling and tapping head and with connections therefrom to the tapping clutch.

Fig. 12 is a detail view looking from the rear of the column, or in other words, from the right of Fig. 13.

Fig. 13 is a plan view of details.

Fig. 14 is a detail view of certain stop mechanism.

A represents the base of a standard type of drilling machine. B is the column. C is the sliding head which carries the spindles $c'$ of the tools whether these be drills or tapping tools. This head also carries a gear chest $C'$ in which is located the gearing as 4, 5 Fig. 11 for driving the spindles of the tools. This gearing is driven from the shaft O moving up and down with the head, and driven from gearing in the casing D. The shaft O drives the gears such as 4 through a master gear.

The head C is made to travel up and down along the column by a pinion $C^2$ formed of teeth cut in a shaft $c^3$ journalled in a part of the head and engaging a rack $B'$ on the column B. The pinion shaft $c^3$ is driven, when the apparatus is used for drilling, through a vertical shaft $D'$ driven from gearing in the gear case D. The lower end of this shaft $D'$ is connected with the rack pinion shaft $c^3$ by means of a clutch $C^3$ and reduction gearing, as will be more fully described hereinafter. When the machine is used for tapping, this clutch $c^3$ is thrown out of operation and then the shaft O not only acts as a driver for the tools, but as the element for transmitting power from the gearing in casing D to the shaft $c^3$ of the pinion $C^2$, at the end thereof opposite that at which the clutch $C^3$ and the reduction gearing is located. This connection between the shaft O and the pinion shaft $c^3$ may be varied, but in the particular form of machine illustrated we have delivered this power through one of the tool spindles, as will be more fully pointed out later, and thence through a clutch $C^4$ directly to the pinion shaft.

E is the main driving pulley of the machine. To this drive pulley is fastened one member of the friction clutch F, Fig. 4. The drive shaft G which is driven through the clutch is hollow and through this extends a clutch release rod H, operated by an arm I which is pinned to the shaft J. On the shaft J is also pinned the lever K, Fig. 1 which is operated by the hand lever L, having the cam shaped arm L', bearing on the roller 1 carried by lever K. The lever K also has a projection M Fig. 9 at its top alongside the roller 1 which engages through the adjusting screw 2 with the slide N. This slide is operated by the tapping control lever P at the front of the machine. This control lever P has a cam Q so that when the lever P is moved in either direction, the cam surface Q always forces back the slide N which operates the lever K by pressing against projection M and through the shaft J this operates the lever I which in turn presses the rod H, thereby releasing the friction clutch F. The purpose of this action is that whenever it is desired to reverse the direction of rotation of the shaft O, as hereinafter described, the entire gearing in the case D will be freed from load, while the reversing is being done. The relation of the cam Q to the reversal of the rotation of shaft O will be later referred to. The upper drive shaft R Fig. 4 in gear box D is driven from the shaft G through variable speed gearing involving a group of shifting gears $d$, slidable on the shaft G to drive the shaft R through either of the gears $d'$, $d^2$, $d^3$ fixed on said shaft R. This shaft R has a bevel pinion S which meshes with the crown gears T and U. These gears are recessed and are carried by toothed clutch members $a$ and $b$. Upon the shaft O is a sleeve $o'$ which has keys $o^2$ engaging the keyways of the shaft O. Upon the sleeve $o'$ is the reversing clutch $o^x$. This clutch has teeth cut in each end so as to engage the clutch members $a$ or $b$ as required. The clutch $o^x$ has keyways $e$ which transmit the power from the clutch $o^x$ to the sleeve $o'$ and thence to the shaft O. These keys $e$ allow the clutch $o^x$ to have a sliding motion upon the sleeve $o'$. The clutch $o^x$ has an annular groove $o''$ in which are fitted the shoes $g^1$ and $g^2$. The shoes Fig. 9 are carried in the fork $h$, which fork is loose upon the shaft $i$. The fork $h$ has a projection $j$ which lies between the spring pressed buttons $k'$ and $k^2$. The buttons $k'$ and $k^2$ are carried in a frame $l$ which frame is pinned to the shaft $i$. To the shaft $i$ is also pinned the tapping control lever P, as previously referred to. The operation of this construction is that when the control lever P is moving in either direction the first movement of the lever releases the driving friction clutch F, because the cam Q forces back the slide N and lever K, which through shaft J and arm I pushes the releasing bar or shaft H and throws out clutch F. The further movement of the lever P causes either the button $k'$ or $k^2$ to move the yoke $h$ and thus move the tapping clutch $o^x$ into engagement with either clutch member $a$ or $b$ to reverse the drive. The final motion of the lever P allows the friction clutch F to again become engaged and transmit power through the gearing in box D to shaft R and thence to vertical shaft O, and to the taps. The special functions of the spring buttons $k'$ and $k^2$ are to create a yielding pressure on the clutch $o^x$ so that the instant clutch F is released by shifting of lever P the spring pressure on $o^x$ is shifted from one side to the other thereof and will force it out of engagement with the reverse clutch, also, to cushion the force of the blow in moving the reversing clutch $o^x$ from one position to another. Furthermore, if, in moving the clutch, the teeth of member $o^x$ should ride on top of the teeth of member $b$ or member $a$, the spring buttons $k'$ or $k^2$ would become compressed upon the further movement of the lever P and would allow the friction clutch F to become partially engaged, after high part of cam Q had passed the end of slide N, so that the teeth on clutch members $a$ or $b$ would be moved sufficiently in a circumferential direction to cause the teeth of clutch $o^x$ to drop into engagement with teeth of $a$ or $b$. In other words, if at the time the clutch $o^x$ is shifted, its teeth do not align with and so as to drop into the teeth of the member $a$ or $b$, as the case may be, the spring at the button will yield while the lever P continues its movement, and having carried the end of the cam Q past the end of the slide N, this will allow the clutch F to begin its engagement again and as soon as this happens rotation will be imparted to the crown wheels T, U with their clutch teeth, thus bringing them to align with the teeth of clutch $o^x$, which immediately drops into engagement under the power of the compressed spring of button $k'$ or $k^2$. Furthermore, if the machine is under heavy load, at the instant that the tapping lever P is moved to reverse position, there would be a tendency for the teeth on clutches $a$ or $b$ and $o^x$ to hang through force of contact. The first movement of the lever P will compress the spring of either button $k'$ or button $k^2$, and this will be sufficient to allow the clutch F to become released, by the action of cam Q of the lever P, and upon the release of the power from the gear train, the pressure on the clutch teeth $a$, $o^x$, or $b$, $o^x$ will be removed and the force of the compressed spring at button $k'$ or $k^2$ will throw the clutch $o^x$, which is now free from restraint, from engagement to neutral position by operating the fork $h$. The further movement of lever P will then carry the clutch $o^x$ to the opposite position into engagement with the other clutch $a$ or $b$. To restate this, if the machine is running light without performing any work, the clutch $o^x$ sliding on the keys $e$ could be engaged and disengaged with either the reversing clutches $a$ or $b$. This could be easily accomplished by having the clutch fork $h$ pinned securely to the shaft $i$, omitting all of the mechanism described above, which includes the omitting of the releasing action of the main friction clutch. But when executing work such as tapping, the torsion on the vertical shaft O and consequently the friction on the teeth of the clutch $o^x$ as they contact with the teeth of either clutch $a$ or $b$, is so great that it is impossible to move the clutch $o^x$ out of engagement with the clutch which is driving it, and this cannot be accomplished until the power is released. This is done by momentarily releasing the clutch F.

Upon the shaft $i$ Fig. 9 is also carried a loose lever $m$ which lever has a projection $n$ which comes in contact with an adjustable screw $l'$ which is carried in the frame $l$. The purpose of the screw $l'$ is to adjust the relation of the lever $m$ to the lever frame $l$ and other mechanisms. The lever $m$ has a hardened stop block $p$. This stop block operates in conjunction with the trip lever $q$. This lever is held in normal position by spring plunger $r$. The trip or latch lever $q$ is operated by adjustable stop $s$ which is located on the trip rod $t$. A plunger $u$ pressing on the lever $m$ always tends to force the lever $m$ upwardly. The plunger $u$ is carried in the plunger case $u'$ and is actuated by the compression spring $w$. The plunger $u$ is provided with a nut $u''$ to limit the upward travel of the plunger. This mechanism is for the purpose of reversing the machine automatically when the taps have reached predetermined depth. When the lever P is moved to give the drill spindles what is termed a right hand rotation, the lever P is moved in the general direction of the arrow at $y$. The moving of the lever in this direction causes the screw $l'$ to force the lever $m$ down so that the spring $r$ pressing against the lever $q$ causes the lower end of the said lever $q$ (shown in dotted lines, and not in engagement) to become engaged with the stop block $p$, thus holding the lever $m$ under pressure of the compressed spring and plunger $u$, which position is maintained until the down travel of the head C, C' causes the adjustable stop $s$ to come in contact with the lever $q$, and when lever $q$ is moved sufficiently, the lever $m$, which is held under spring pressure by plunger $u$, is released and the pressure of the spring $w$ forces the lever $m$ up, which, through contact with the screw $l'$ of fork frame $l$, causes the reversing movement of this frame and lever P, and the release of the clutch F through cam Q, and when this clutch F is momentarily released it removes the driving pressure from the contacting teeth of the clutch $o^x$ and $b$ by stopping the drive gearing, and also removes the friction on the keys $e$, making possible the easy moving of the clutch $o^x$ to the neutral position, and, if desired, to the opposite position, and finally allows the reengagement of the friction clutch F, giving a complete reversal of the direction of rotation of spindles on the machine.

A further advantage gained from the above construction is that when the latch lever $q$ is latched over the stop block $p$ the tapping control lever P can be moved manually so as to reverse the direction of spindle rotation as might be necessary in case of a broken tap or in tapping materials such as steel, which requires the working of the taps in and out of the hole (imitating the operation of hand tapping) before the required depth of tapping is reached. This rapid reversal of the spindles is accomplished by the hand lever P without releasing the lever $m$, which remains under heavy spring tension until an automatic action takes place by the adjustable stop $s$ forcing the outer end of the lever $q$ downward, which in turn releases the lever $m$ so that the spring $w$ pressing against said lever causes a reversal of the spindle rotation.

The failure of multiple tapping in the past has been due to the lack of suitable and positive releasing mechanism, also to the lack of a positive feed or travel of the drill head C to correspond to the pitch or thread of the tap being used. To eliminate this trouble we have developed the following:

The head of the machine carries a multiplicity of spindles $c'$, these like spindles being driven by shafts as 3 through gears 4 and pinions 5, Fig. 11. Any one of these shafts is extended upward and forms a driver for the gear 6. Only one of these shafts is shown, i. e., the one which is extended up as stated. A gear box having a multiplicity of spindles or shafts driven from master gearing as 4 is old and well known. A suitable housing or frame extension 7 supports the extended shaft 3, also a suitable bracket 8 is bolted to the side of the head C. This extension and bracket form the support for the upper ends of the shafts; also form supports for the gears and the plates carrying the intermediate or change gears. This bracket is attached to the head C at the right hand side of the same, at a point where the rack pinion shaft $c^3$ is extended to carry a worm gear and a releasing clutch $C^4$, a duplicate of that $C^3$ on the left side of the head, and used for the drilling feed, as will be described. The gears 6, 9, 10 and 11 are changeable gears which are furnished to make the movement of the head correspond to the pitch of the tap being used in the machine. Suitable means are provided for fastening gears into proper relation one with the other. The gear 11 is fastened to the shaft 12. The lower end of this shaft carries a worm 13 which is constantly in mesh with the worm wheel 14. The worm wheel 14 forms part of the clutch member 15, Fig. 3. The opposite member 16 of this clutch is fastened to the rack pinion shaft section 17 by means of sliding key. The clutch member 16 is operated by the expanding fingers 18. These fingers are actuated by the collar 19. The collar is operated by fork 20 which is carried on the shaft 21. At the upper end of the shaft 21 is the lever 22, Figs. 12, 13, which is connected to the feed control lever 23 of the machine. The bar 24 connects the lever 22 with the feed lever 23 by an arm 25 connected to a vertical shaft 26, to the lower end of which the lever 23 is connected. When the feed control lever 23 is moved toward the center of the machine, the regular drilling feed clutch $C^3$, Figs. 2 and 13, is engaged for feeding the head C for drilling. When the lever 23 is moved away from the center of the machine, the tapping feed clutch $C^4$, Figs. 3 and 13, is engaged, thus the one lever controls both the drilling feed and the tapping feed, making it impossible to have both feeds engaged simultaneously. In drilling the head C is traversed by power derived from shaft D' through clutch $C^3$ while in tapping the power for traversing the head is derived from shaft O and the gear train of Fig. 11 through clutch $C^4$.

To guard against operator engaging the tapping feed when the drilling is going on, or engaging the drilling feed when the tapping is going on, the following mechanism is provided:

On the shaft 21 is pinned a stop lever 27, Figs. 12 and 13. Upon the extension of the head C is a segment bracket 28 having a lever 29. This lever is carried upon a shaft 30, which shaft has stop blocks 31. These blocks are of such construction, and are pinned upon the shaft 30 so that when the lever 29 is in central or "feed locking" position, the lever 27 cannot be moved in either direction because stop blocks 31 prevent lever 27 from moving, see Fig. 14. When the lever 29 is moved to the left of Fig. 12, or in other words to "drill feeding" position, one of the stops 31 is moved away from the path of lever 27 and then it is possible to move the feed control lever 23 to cause the regular drilling feed clutch $C^3$ to become engaged, and the tapping clutch $C^4$ to be disengaged. When the lever 29 is moved to "tap feed" position, i. e., to the right in Fig. 12, the other stop 31 is moved out of the path of the lever 27 and then the feed control lever 23 can be moved in the opposite direction so as to cause the engagement of the tapping feed clutch $C^4$ and disengagement of drill clutch $C^3$. It is thus impossible for operator to get the tapping feed into mesh when drilling work is being done, or to get the drilling feed into engagement when tapping work is being done.

On the side of column B is a trip rod 32, Figs. 12 and 13, on which is an adjustable dog 33 for tripping off the drilling power feed, and an adjustable dog 34 for tripping off the tapping power feed on the up motion of the head. The dog 34 has double incline faces the same as dog 33 excepting they are in reverse position to operate on the opposite side of the trip arm 37. The rod 32 at the upper end is supported by a bracket 35; this bracket has a cam surface 36 which is an emergency stop should the operator throw in the tapping power feed when the trip arm 37 is above the trip dog 34. This safety stop makes it impossible to damage the machine by carelessness of the operator. Trip arm 37 connects with the clutch operating connections through the rod $37^x$.

Reverting more in detail to some of the features referred to above: An advantage arises from having the clutch F at the top of the machine instead of at the bottom. In the latter case the bottom clutch has the drive belt between it and the upper pulley, and when the lower clutch is thrown out the upper pulley acting like a fly wheel will by its momentum and the momentum of the belt cause the gearing in the head to continue operating for a brief period before the parts come to rest, but with the clutch arranged at the top of the machine and between the upper drive pulley and the gearing, the train of drive mechanism will not be subjected to the momentum of the belt and upper pulley after the clutch is thrown out and will stop instantly.

Our arrangement makes it possible to mount the motor (electric not shown) at the base of the machine and stop the machine instantly without stopping the motor by simply throwing out the upper clutch.

Clutch F: This comprises a clutch ring $f$ set into driving position by levers $f'$ which have cam shaped end $f''$ to bear on a ring $f^2$ and force the clutch ring to active position. The levers (only one is shown) are operated by a sleeve $f^3$ grooved at $f^4$ to receive a part from the lever. This sleeve is pressed to set the clutch by a spring $f^5$ backed by the shell $f^6$. The release rod H connects by a pin $h^4$ with a collar $h$ which has ball bearings $h'$ between its flange $h''$ and the sleeve $f^3$, and other ball bearings $h^3$ between it and the shell or cap $h^2$. Motion is imparted to the hollow shaft G when the clutch is set by a member $f^7$ keyed on the hollow shaft G.

It will be observed that the clutch is between the upper pulley E and the shaft G, so that as soon as the clutch is thrown out the momentum of the pulley has no effect upon the driven train of gearing which therefore will instantly stop. The clutch is released by positive pressure exerted by the rod H and it sets itself again in driving position by the spring as soon as pressure on the rod H is relieved.

An advantage in the use of a clutch set by spring pressure is that the pressure being constant, the power that the clutch will deliver is always constant, requiring very little adjustment. Whereas a clutch that is set by lever or cam action, the pressure will vary with the wearing of the connecting parts, giving unequal driving power and necessitating frequent adjustment.

Reversing mechanism: The teeth of the reversing clutch members are not cut in the opposing faces of the bevel gears T, U, but instead these teeth are cut in the opposing faces of the enlarged ends or heads $a$, $b$ of the sleeves $a^2$, $b^2$, which are loosely mounted on the shafts, and to which sleeves the bevel gears are keyed. The gears T, U being the more expensive, renewals of the toothed clutch members can be made economically. The use of the sleeve or collar $o'$ between the shifting clutch $o^x$ and the shaft is of advantage for the reason that the clutch can be shifted more readily than if it were splined directly to the shaft. This collar, finding as it does a bearing at each end against clutch members $a$, $b$, absorbs the end thrust due to the pulling strain of shaft O, when tapping is being done, and thus the shifting clutch member $o^x$ is freed from this strain and can be operated more easily.

Oil protection: It will be seen that at the upper and lower faces of the casing in which the reversing gearing is located collars $v$ are fixed surrounding the shaft O, Fig. 4.

These collars have oil wiping grooves $v'$ in an interior web $v''$ of the collar which bears on the exterior of the sleeves $a^2$, $b^2$ of the clutch members $a$, $b$. These sleeves near their ends are provided with grooves $a^3$ to catch the oil, which is thrown off by centrifugal force into the chambers $v^2$ of the collars. From the lower collar it drains away through any suitable piping connected with the opening $v^3$.

Control lever P: This lever enables us to stop driving the taps and stop the head C and to reverse the direction of movement of the head C from an upward to a downward direction, and by the same movement of the lever to set the automatic reversing mechanism in condition for its automatic action to take place when the prescribed depth of tapping has been done. This effect is due to the fact that the movement of the lever P not only reverses the direction of movement of the head but also compresses the spring $w$ and allows the latch $q$ to hold it compressed by locking the arm $m$.

This reversing action of the head's movement and the setting of the spring $w$ under compression can take place by operating the lever P as soon as the taps leave the work, and as it is common practice to duplicate the tapping operation on the same piece of work, this can be done and time will be saved, because by effecting the reversal by lever P as soon as the tap leaves the work we do not have to wait for any definite further movement of the head upwardly. Again it will be noticed that when the spring $w$ is set under compression and latched the motion of the head can be reversed, either up or down, by operating the lever P, and while the spring is still held ready for action, that is to say, it can be reversed from upward to downward movement, and as to the reversal from downward to upward movement, the lever P would have to be operated before the automatic trip $t$, $u$ released the spring $w$. Or, the lever P could be set in neutral position so that its cam Q would throw out clutch F and stop the machine.

All these actions can take place without releasing the automatic reversing spring $w$.

Lever L: This lever is provided to throw the clutch F out of operation or by moving the lever in the opposite direction allow the clutch to come into action again by its spring. This lever L has a notched cam shaped end acting upon the arm K. When moved to release the clutch the high part of its cam through arm K pushes rod H to throw the main clutch F out, and the notched construction maintains or frictionally locks the parts in position.

Connections for moving the head in tapping: These connections, involving the change gears 6, 9, 10, 11, and shaft 12, may be driven from the main driving shaft O for the head gearing, but we prefer to drive from spindle of one of the taps as shown in Fig. 11 where said spindle is shown at 3. This spindle is located off to one side of the center of the head and thus the change gearing may be located far enough off center in respect to the head as to avoid the overhanging frame part when the head goes up, so that this upward travel is not unduly limited. This would not be the case if the change gearing were driven directly from the shaft O. This change gearing moves up and down with the head and if it reached to the center line of the head to derive its power directly from the shaft O, it would limit the head's upward movement by coming against the overhanging frame part or reversing gear casing. Also additional gears in respect to the number shown would have to be used, if we drove directly from the shaft O instead of from one of the offset spindles of the taps.

Drilling connections: As before stated, when drilling is being done the clutch $C^3$ of the rack pinion shaft is thrown into work and the tapping clutch $C^4$ is thrown out of work and then the power to give the vertical feeding movement to the head C is delivered through shaft D' from the gear casing D. The lower end of this shaft has a worm 41 Fig. 2 meshing with a worm wheel 40 on a shaft 42 mounted in a clutch box or casing 43 carried by the head C. This shaft carries a clutch $C^3$ which is operated by pivoted fingers like 18 of Fig. 3 from a collar 45 loose on the shaft. This collar is operated by a fork 46 on the shaft 26 before mentioned, and is operated by the hand lever 23. The clutch $C^3$ when set turns the pinion 47, which through reduction gearing 48, 49, 50 operates the shaft of the rack pinion $C^2$. The shaft 26 as before described connects by an arm 25 and rod 24 with the tapping clutch.

The upper end of the shaft D' is driven by change speed gearing mounted in the casing D through a worm wheel 51 Fig. 5 and a coupling 52 Fig. 6 which is constructed to compensate for any misalignment of the shaft D' with the shaft 53 of the worm wheel.

This change gearing is operated from the shaft G through the shaft R and the gears $d'$, $d^2$, $d^3$ thereon. Referring to Fig. 5 which is a developed view of this gearing showing the parts spread out instead of in their real relation, there is a shaft 54 at the upper part of the casing alongside the shaft R having a gear 55 meshing with and driven from the gear $d^3$. On this shaft there is a group of two gears 56 adapted to be shifted, to engage with certain gears on a shaft 57, as will be obvious. This shaft 57 in actual practice is below the shaft 54. This shaft 57 likewise carries gears keyed thereto to be engaged by gears of a shifting group 58, mounted on a shaft 59 arranged below the shaft 57 and substantially alongside the shaft G. This shaft 59 carries a worm 60 which drives the worm wheel 51. Suitable yokes are provided for shifting the various groups of shifting gears for changing the speed, these being indicated at 61, 62, 63. By this change speed gearing the speed of drilling may be varied, and by shifting the gears $d$ the speed of tapping may be altered.

The drilling mechanism has been made the subject of another application and therefore it is not further described herein, said application being #490,662.

Our method of tapping is briefly as follows:

The spindles revolving in the right hand direction, the trip lever or latch $q$ having been set by the tapping lever P, as previously described the head is moved towards the work by the hand pilot wheel shown at left of Fig. 2 and in Fig. 1, and when the taps are about to enter the holes the feed lever 23 is moved away from the machine engaging the tapping feed, the drilling feed now being out of action by the stop arm 27. The head continues its downward movement, moving at the same speed as the pitch of the taps until it is released and reversed by the stop $s$ striking against locking lever $q$, or until it is reversed by the reversing lever P. When the spindles are reversed the head moves upward at a velocity corresponding to the pitch of the taps until the work is cleared, and the tapping gearing is released by the lever 37 contacting with the dog 34, or it can be disengaged by moving the lever 23 towards the machine to release the power tapping feed. After the tapping power feed is released, the head can be quickly run by the pilot wheel upward as desired, and with the lever P the locking lever $q$ and the spring $w$ can be set for another operation, leaving the spindles revolving in the right hand direction.

In tapping holes which are not drilled way through the work (what is known as bottomed holes) the taps must not go lower than a fixed determined point. Otherwise they will strike the bottom of the hole and be broken. This makes the reversing by hand a hazardous operation, but with our method we can stop the downward movement of the head and reverse to the upward movement within a length of movement of from .001 to .004 of an inch.

This accuracy is made possible by the combination of elements above referred to, viz; 1st. The setting of the lock $q$ by the lever P and not by the upward movement of the head, as previously practiced.

2nd. The holding of the reversing spring $w$ in a locked position and having yielding connections upon which it operates when released.

3rd. The releasing and reversing clutch spool being held yieldingly, and spring pressed, and the driving force being released for a period sufficient to release the spool clutch.

To make a machine that will successfully do both drilling and tapping there are several features that must be accomplished and a few of the most prominent are, the reduction of the peripheral velocity of the taps, the reduction of speed to be made between the main driving clutch and the tap; the positive and accurate advancement of the taps into the work, (the velocity equalling the pitch of the taps; the positive and accurate stopping when the pre-determined depth is reached; and the quick and positive reversing of the taps, taking them from the work with the same accurate motion with which they entered the work.

We have provided means for changing the speed of rotation of the taps. This gearing is located in a supplemental housing D² Fig. 6 arranged on the right hand side (looking from the front) of the main gear casing D at the top of the column.

This supplemental gear casing is on the opposite side of the main casing D from that upon which the supplemental gear casing D³ is attached which carries therein the shafts 54, 57 and 59 and the gearing above described for varying the speed of the vertical traversing movement of the tool carrying head C.

This variable speed gearing for the taps comprises as shown in Fig. 6 and in the developed view Fig. 7 a pair of shifting gears 64, 65, on a shaft 66. These gears are of different diameters and are adapted to engage severally with the gears $d'$, $d^2$ on the shaft R. These shifting gears are shifted by a suitable fork 67 Fig. 6ª operated by an arm 68 on a shaft 69 journaled in the casing and having a depending arm 70 provided with a segment 71 as shown in Fig. 8 having a recess 72 arranged centrally thereof to receive a locking pin 73 mounted in the housing and operated by a handle 74. The arm 70 is operated by a hand lever 75, moving over a segment 76 which is provided at its ends with sockets 77 to receive a locking pin by which the arm may be set in either one of two extreme positions to make either the shifting gear 64 engage with the gear $d'$ or the shifting gear 65 engage with the gear $d^2$.

The shaft 66 is driven by reduction gearing 78, 79 from shaft 80. This shaft has a gear 81 fixed thereon which is driven from one of the gears of the shifting set $d$. This shifting set $d$ as before stated is adapted to drive the shaft R from shaft G through either one of the gears $d$, $d^2$, $d^3$, and this same set when shifted into a certain position will drive the gear 81 and will be neutral in respect to the gears on shaft R so that under this adjustment the drive instead of being direct from shaft G to shaft R will take place from G to R by way of the shafts 80 and 66 and the gears thereon and the reduction in speed will be according to the position of the shifting gears 64, 65.

The shifting of the set of driving gears $d$ is done by an arm 61 mounted on a pin 82 journalled in the casing and having a handle 83 working over a segment 84 provided with sockets to receive a spring detent 85, to hold the parts in any one of three positions. This arm 83 is provided with a socket 86 to receive the lower end of the locking pin 73, and the relation of the parts is such that the pin will lock either the shifting lever 70 or the lever 83 so that it will be impossible to set the shifting gear set $d$ and the shifting gears 64, 65, into engagement with gears on the shaft R at the same time.

This provides a safety arrangement whereby the shaft R may be driven either direct from shaft G or indirectly from shaft G through the speed reduction shafts 80, 66 and the gearing thereon.

If the machine is organized for drilling only the speed reduction gearing contained in the supplemental gear box D² is not used and this gear box is omitted.

The open side of the main gear box is then covered by a suitable plate. In this case the shifting lever 61 would be mounted in the supplemental casing D³ and operated by a hand lever on the side of the column and connected up by a vertical shaft with the lever 61.

The shifting gear set $d$ will give three speed changes for the taps or drills. The shifting gears 64, 65 will give two speed changes for tapping.

Drilling: Having the machine set for the drilling feed, the workman places the work on the table, advances the head by the pilot wheel until the drills enter the drill bushings and then throws in the power feed with the lever 23, which is moved towards the machine.

The stop 33 is set at the proper position on the rod 32 so that when the arm 37 contacts with it, it will throw the feed out at the downward movement of the head when the drills pass through the work or reach the desired lowest position.

The operator then elevates the head with the pilot wheel to the desired position and the drilling is repeated.

Tapping: When the tapping is to be done, the operator puts the reducing gears at the top of the machine into position, sets the tapping feed as described, and when the work is placed under the taps, the head is brought down to the position where the taps will enter the work. Then the lever P is drawn forward which sets the spring and starts the taps revolving in the right-hand direction. Then the feed lever 23 is moved away from the machine, which starts the tapping feed, which carries the head downward until the stop $s$ contacts with the boss on the lever $q$. This reverses the motion of the machine, and the head moves up automatically until the lever 37 contacts with the stop 34. The work is then taken out, the new work slipped into position and the operation repeated.

One of the things that contributes to the accuracy of the stopping is having a heavy spring to do the reversing. It is not practical to set this heavy spring by the upward movement of the head for the following reasons:

First, the spring being very heavy, it is difficult to secure sufficient leverage by turning the pilot wheel and elevating the head against the stop, to set the spring.

The further reason is that when the head is stopped in its upward movement, providing it was possible to set the spring by the upward movement of the head, the operator would have to go to the side of the machine and manipulate the pilot wheel in order to do this, whereas, with the lever P in front of the machine, all it is necessary for him to do is to pull the lever out and the operation is completed regardless of the position of the head in its upward movement.

A further advantage in having the reversing spring set by the lever instead of the upward movement of the head is that in tapping operations the upward movement of the head can be stopped by throwing out the power feed just at the point where the taps clear the work, and then to start a new operation the lever P can be pulled forward and the head will immediately begin to feed down.

It is desirable to have extra motion to the head so that in case you need more clearance between the work and the taps, then the head can be moved upward sufficiently high to give this clearance. This is possible where we can do the reversing and set the spring by the lever, but if we should do the reversing and set the spring by having another stop on the rod $t$, to contact with the stop on the lever $q$, then if this stop was set so that the taps would just clear the work, it would be necessary to loosen it and move it down on the rod $t$ if the head was to be elevated any greater distance.

The reversing motion depends on the setting of the trip stop S, but unless the spring was heavy enough to effect the reversing of the machine, there would be no measure of accuracy in the stopping of the head in the downward movement.

We claim:

1. In combination a tapping tool, a shaft for communicating power to the tapping tool to rotate the same, driving means for the said shaft including a main clutch, reversing means including bevel gears having clutch teeth, and a shiftable toothed member for changing the direction of rotation of the said shaft and the tap, means for shifting the shiftable toothed member of the reversing means to effect said change of motion, and at the same time to release the clutch so that the reversing action of the tap will be initiated free from load, substantially as described.

2. In combination in a tapping machine, a work support, a head having movement towards and from the work support, a spindle for driving the tool mounted in said head to have movement to and from the work always in unison with that of the head, a shaft with gearing between the same and the tool spindle for driving the same, a main driving shaft, a single pulley for driving the same, said shaft running always in one direction, reversing gearing between the said main shaft and the spindle driving shaft, a clutch between the pulley and the main driving shaft, and means for shifting said reversing gearing to reverse the direction of the tap independent of any influence exerted by a movement of the head relative to the spindle, and at the same time releasing the clutch so that the reversing action will be performed free from load and the tap promptly reversed, substantially as described.

3. In combination in a tapping machine, a work support, a head having movement towards and from the work support, a spindle for driving the tool mounted in said head to have movement to and from the work always in unison with that of the head, a shaft with gearing between the same and the tool spindle for driving the same, a main driving shaft, a single pulley for driving the same, said shaft running always in one direction, reversing gearing between the said main shaft and the spindle driving shaft, a clutch between the pulley and the main driving shaft, and means for shifting said reversing gearing to reverse the direction of the tap independent of any influence exerted by a movement of the head relative to the spindle, and at the same time releasing the clutch so that the reversing action will be performed free from load, and the tap promptly reversed, and means for automatically operating said shifting means when the tapping has progressed to a predetermined depth, substantially as described.

4. In combination a tapping tool, a transmission shaft for communicating power to the tool to rotate it, a hollow power shaft, a main driving clutch for driving the same, gearing between the shafts, including reversing gears, a rod extending through the hollow shaft for releasing the clutch, a lever having means associated therewith for changing the drive from one reversing gear to the other, said lever operating the rod to release the main driving clutch when the reversing is being done, substantially as described.

5. In combination a tapping tool, a transmission shaft for communicating power to the tool, a hollow power shaft, a main driving clutch for driving the same, gearing between the shafts, including reversing gears, a rod extending through the hollow shaft for releasing the clutch, a lever having means associated therewith for changing the drive from one reversing gear to the other, said lever operating the rod to release the main driving clutch when the reversing is being done, an arm for engaging the rod, a rock shaft and a second arm interposed between the said rock shaft and the lever, a casing enclosing said gearing, said rock shaft bearing in the casing and having one of said arms within and the other without the said casing, substantially as described.

6. In combination a tapping tool, described, a vertical shaft for communicating power to the tool to rotate it, a horizontal drive shaft, a main clutch for driving the same a single direction pulley for driving the clutch, a transmission shaft extending parallel with the horizontal drive shaft gearing between the drive and transmission shaft, reversing means between the transmission shaft and the vertical shaft including a pair of gears loose on the vertical shaft, a gear on the transmission shaft meshing therewith and a shifting clutch to connect either of the pair of gears with the vertical shaft, a lever connected to the shifting clutch of the reversing means, and a rod operated by said lever for releasing the clutch during the shifting of the reversing means.

7. In combination a tapping tool, a shaft for communicating power to the tool to rotate it, reversing means including a pair of loose gears and a shifting clutch for reversing the direction of motion of the said shaft, a lever connected to the shifting clutch of the reversing means, a main driving clutch for operating the said shaft, and means for releasing the latter clutch on the movement of the reversing means and lever in either direction.

8. In combination in a tapping machine, a shaft for communicating power to the tapping tool, a single pulley rotating in one direction, a main driving shaft, a main driving clutch between said pulley and the main driving shaft, reversing transmitting means between said shafts including a pair of reversing gears loosely mounted on the shaft first mentioned, a gear rotated by the main driving shaft and meshing with said loose gears, a toothed reversing clutch to engage teeth on the loose gears for connecting either one of the said loose gears with the shaft upon which they are mounted, a lever connected to the reversing clutch for operating it, and a cam carried by the lever for releasing the main driving clutch substantially at the beginning of the operation of the reversing clutch, said main driving clutch being reset to continue the drive as the lever completes its movement and the reversing clutch has been set to reverse the direction of rotation of the tap, substantially as described.

9. In combination in a tapping machine, a shaft for communicating power to the tapping tool, a single pulley rotating in one direction, a main driving shaft, a main driving clutch between said pulley and the main driving shaft, reversing transmitting means between said shafts including a pair of reversing gears loosely mounted on the shaft first mentioned, a gear rotated by the main driving shaft and meshing with said loose gears, a toothed reversing clutch to engage teeth on the loose gears for connecting either one of the said loose gears with the shaft upon which they are mounted, a lever connected to the reversing clutch for operating it, and a cam carried by the lever for releasing the main driving clutch substantially at the beginning of the operation of the reversing clutch, said main driving clutch being reset to continue the drive as the lever completes its movement and the reversing clutch has been set to reverse the direction of rotation of the tap, the said main clutch being under spring pressure to reset for transmitting power from the pulley as the lever completes its throw after shifting the reversing clutch, substantially as described.

10. In combination a tapping tool, a tool driving shaft, reversing means for driving said shaft in either direction a single drive pulley, a main driving clutch controlling the transmission of power from said pulley, means for shifting the reversing means to change direction of motion of the shaft and at the same time releasing the clutch so that reversing can be done free from load upon said reversing means, said clutch being re-engaged as a result of the continued operation of the shifting means, substantially as described.

11. In combination a tapping tool, a shaft for driving the tool, reversible rotating means for said shaft, a main clutch for operating the driving means, a lever having a cam a member pushed by the cam for releasing the clutch when the lever has performed a partial stroke in either direction a connection for shifting the reversible driving means from said lever, and a spring for throwing the clutch into work again when the continued movement of the lever in one direction has carried the high point of the cam past the said member.

12. In combination a tapping tool, a tool driving shaft, reversing driving means for said shaft, including a shiftable member, a main driving clutch apart from the reversing means, and a hand operated lever, for releasing the clutch and shifting said member while the latter is free from the driving power of said clutch.

13. In combination a tapping tool, a tool driving shaft, reversing driving means for said shaft, including a shiftable member, a main driving clutch apart from the reversing driving means, and a hand operated lever for releasing the clutch and shifting said member while the latter is free from the driving power of said clutch, said hand lever having a yielding connection with the shiftable member, substantially as described.

14. In combination a tapping tool, a shaft for driving the tool, reversing rotating means for the said shaft including gears having clutch teeth and a toothed shiftable member to engage the same, a main clutch with power transmission means for operating the said driving reversing means, a hand lever, yielding connections between the hand lever and the toothed shiftable member of the reversing means for setting said means for driving the said shaft in either one direction or the other, and means controlled by the hand lever for releasing the main clutch and for setting said clutch again during the reversing action and during the movement of the lever in either direction, the said yielding connection permitting the lever to complete its movement for the re-engagement of the clutch despite the fact that the reversing action may be delayed due to the contact of the teeth of the reversing means.

15. In combination a tapping tool, a shaft for rotating the tool, a pair of bevel gears loose on said shaft, each having a clutch member, a bevel driving gear for driving the loose gears, one in one direction and the other in the opposite direction, a clutch splined to and slidable along the shaft from one clutch member to the other, a hand lever with connections for shifting said slidable clutch in both directions, said connections being yieldable on either movement, forward or backward of the hand lever, a main clutch with means operated thereby for operating the driving bevel gear, and means operated by the hand lever for controlling the release and re-engagement of the main clutch on either stroke of said lever whereby the shifting of the slidable clutch will take place free from load and the hand lever can complete its stroke prior to the final movement of the slidable clutch, substantially as described.

16. In combination a tapping tool, a shaft for driving the tool, reversing driving means therefor, a lever for setting the reversing means to change the direction of rotation of the shaft, a connection between the lever and the reversing means including spring means which when the lever is operated will be stressed to apply the force thereby stored therein to the reversing means to shift the same, a main driving clutch with connections for driving said reversing means, and means operated by the hand lever for releasing the clutch while the spring means is stressed or compressed, said clutch becoming effective for driving the reversing means when the spring means completes the shifting of the reversing means.

17. In combination a tapping tool, a shaft for driving the tool, reversing driving means for the said shaft, a hand lever with connections for setting said reversing means to drive the shaft either one way or the other, said connections including yielding means which are affected by the operation of the hand lever in either direction, a main clutch with connections for driving the reversing means, said clutch being released by the operation of the lever in either direction, whereupon the yielding means on relaxing sets the reversing means for driving in the reverse direction, and thereafter the clutch re-engages to drive the reversing means, substantially as described.

18. In combination a tapping tool, a shaft for driving the tool, reversing driving means for said shaft, including a shifting clutch on said shaft, a pivotally mounted fork engaging the said clutch to shift it, an arm pivoted coaxially with the fork, a spring between the upper side of the fork and said arm, a spring between the lower side of the fork and said arm, a hand lever connected with the arm for operating the same to stress one or the other of said springs on either stroke, a main clutch for driving the reversing mechanism, and means operated by the hand lever on either stroke for releasing the clutch, following which the lever through the spring shifts the reversing clutch, and thereafter the driving clutch resumes driving of the shaft through the reversing means.

19. In combination a tapping tool, a shaft for driving the tool, toothed reversing rotating means for said shaft, means for setting said toothed reversing driving means to rotate the shaft either one way or the other, a main clutch for transmitting driving power to the reversing driving means which reversing driving means is interposed between the clutch and said shaft, and means for throwing said clutch out of operation when the reversal of the drive is to take place, the said clutch resuming driving when the reversing means has been shifted, substantially as described.

20. In combination a tapping tool, a shaft for driving the tapping tool, a reversing driving means for said shaft, a main clutch for imparting power to said reversing driving means, which reversing driving means is interposed between the clutch and said shaft a member connected with the reversing driving means and shifting its position with the shifting of said reversing means in changing the direction of drive, and clutch controlling means operated by the shifting of said member to release the driving clutch so that the shifting of the reversing means can be effected free from load, substantially as described.

21. In combination a tapping tool, a shaft for driving the tapping tool, a reversing driving means for said shaft, a main clutch for imparting power to said reversing driving means, which reversing driving means is interposed between the main clutch and said shaft, a member connected with the reversing driving means and shifting its position with the shifting of said reversing means in changing the direction of drive, and clutch controlling means operated by the shifting of said member to release the driving clutch so that the shifting of the reversing means can be effected free from load, said shifting member operating to release the main clutch at an intermediate part of its shifting stroke, the clutch thereafter re-engaging automatically to drive the reversing means, as the said stroke is completed.

22. In combination a tapping tool, a driving shaft therefor, reversing driving means therefor, a hand lever with connections to the reversing means for shifting the same on either stroke of the hand lever, said connections including yielding means to cushion the force applied through the hand lever to the reversing on either stroke, substantially as described.

23. In combination a tapping tool, a tool driving shaft therefor, reversing driving means therefor including gears having toothed clutch faces and a toothed shifting clutch member, a hand lever with connections to the reversing means for shifting the same on either stroke of the hand lever, said connections including yielding means to cushion the force applied through the hand lever on either stroke, automatic means including a power spring for shifting the reversing movement of said shaft for the withdrawal of the taps when the desired depth of tap has been made, said power spring being compressed by the movement of the hand lever in one direction, means for holding said spring compressed, and means for releasing said spring when the required depth has been cut, said hand lever with the yielding connections performing their shifting function in either direction while the power spring is held under compression by its holding means.

24. In combination a tapping tool, a shaft for driving the tapping tool, a reversing driving means for said shaft to drive the same in either direction, a main clutch with connections for imparting driving power to said reversing means which latter means is interposed between the main clutch and said shaft, automatic means for shifting the reversing means to reverse the rotation of the shaft when the tapping is completed, and means for automatically releasing the clutch so that the shifting of the reversing means can be accomplished free from load, substantially as described.

25. In combination a tapping tool, a shaft for driving the tapping tool, a reversing driving means for said shaft to drive the same in either direction, a main clutch with connections for imparting driving power to said reversing means which latter means is interposed between the main clutch and said shaft, automatic means for shifting the reversing means to reverse the rotation of the shaft when the tapping is completed, and means for automatically releasing the clutch so that the shifting of the reversing means can be accomplished free from load, and means for automatically re-engaging the clutch to resume driving of the shaft when the reversing means has been shifted to drive in the reverse direction, substantially as described.

26. In combination a tapping tool, a shaft for driving the tapping tool, driving means for said shaft, including reversing mechanism, and a main clutch with driving connections to the reversing mechanism which mechanism is interposed between the main clutch and said shaft, automatic means for shifting said reversing mechanism for changing the direction of the rotation of the shaft when a predetermined depth of the taps has been reached means for locking said automatic means in position ready to act, and hand operating means for shifting the reversing mechanism independently of and without interfering with the said lock or the capacity of the automatic means to perform its function.

27. In combination a tapping tool, a shaft for driving the tapping tool, driving means for said shaft, including reversing mechanism, and a main clutch with driving connections to the reversing mechanism, automatic means for shifting said reversing mechanism for changing the direction of the rotation of the shaft when a predetermined depth of the taps has been reached, and hand operating means for shifting the reversing mechanism independently of and without interfering with the capacity of the automatic means to perform its function, and means for releasing the main driving clutch when the reversing is done either automatically or by hand so that said reversing can be performed free from load, substantially as described.

28. In combination a tapping tool, a shaft for driving the tapping tool, reversing mechanism for driving said shaft to change its direction of motion, shifting means for said reversing mechanism, including a hand lever, and a movable member engaging a shiftable part of the reversing mechanism, springs between said member and the hand lever to impart the power from the hand lever to said member yieldingly in both directions, and automatic means for reversing the motion of the shaft through said movable member, said automatic means including a power spring, means for compressing said spring when the hand lever is moved in one direction, a latch for holding said spring under compression, means for tripping said latch when the taps have reached the predetermined point, whereupon said power spring will operate said movable member, substantially as described.

29. In combination a tapping tool, a shaft for driving the tapping tool, reversing driving means for said shaft, a shift member for setting said reversible driving mechanism to drive said shaft in either direction, a hand lever having spring connections with said member in which power is stored when the hand lever is moved in either direction, a spring in which power is stored when the hand lever is moved in one direction, a latch for holding said spring, automatic trip means for releasing said spring from the restraint of the latch, when the tool reaches a certain point, said spring then acting upon the shift member to reverse the movement of the shaft, and a driving clutch for the reversing mechanism, with means for releasing said clutch when either the hand lever is thrown from one position to the other, or when the automatic trip is operated, so that the reversing is performed free from load, substantially as described.

30. A machine according to claim 29, having means for automatically resetting the clutch for driving the reversing mechanism when this is shifted to change the direction of rotation of the shaft.

31. In combination a tapping tool, having a drive shaft for the tool, reversing drive means for the shaft to change its direction of rotation, a hand lever with means for setting the said drive means for rotation of the shaft in one direction or the other, automatic means including a power spring for shifting the reversing drive means in one direction, said automatic means being set with its spring compressed by the movement of the hand lever which sets the drive for rotation in forward direction, an automatic trip controlling the automatic shifting means to hold it against action for a predetermined time, means for automatically releasing the trip, said handle being free to shift the reversing mechanism while the automatic means is held by said trip ready to act, substantially as described.

32. A machine according to claim 31, having a main driving clutch for the reversing mechanism which latter is interposed between said clutch and said tool drive shaft, with means operated by the hand lever, or as a result of the automatic action for releasing said clutch when a reversing action is to take place, and means for thereafter automatically resetting the clutch in driving relation, substantially as described.

33. In combination a tapping tool, comprising a shaft for driving the tool, reversing driving means for said shaft, automatic means for shifting said reversing driving means, including a spring and a trip for holding it under compression, and a hand operated member for shifting the reversing mechanism while the automatic means is held by said trip ready to act, substantially as described.

34. A machine according to claim 33, having a main clutch for driving the reversing mechanism, with means for automatically releasing the clutch when the reversing is to be done, and means for thereafter automatically resetting the clutch for driving, substantially as described.

35. In combination a tapping tool, a shaft for driving the tool, reversing gearing for driving said shaft, a pivoted member for reversing said gearing, a lever pivotally mounted and having an arm for operating said pivoted member either one way or the other, springs between said arm and said member, one of which is compressed when the lever moves one way, and the other is compressed when the lever moves the other way, and automatic mechanism for reversing the said gearing, comprising a power spring, a pivoted arm for compressing said spring, said arm being operated by the pivoted member when this is operated from the lever through one of the springs, a latch for holding said arm with the power spring under compression, and trip means for releasing said latch when the tool has performed its prescribed operation, substantially as described.

36. A machine according to claim 35, having a main clutch with connections for driving the reversing mechanism, and means for releasing said clutch when the reversing is to be done either by the lever or by the automatic means, substantially as described.

37. A tapping machine, comprising a head carrying a tool, a column on which the head slides, a rack thereon, a pinion on the head engaging a support holding said head slidably, a shaft for driving the tool, reversing driving means for the shaft, automatic means for shifting said driving means to reverse the motion of the shaft to reverse the rotation of the tool, and a connection between the said shaft and the pinion for giving an upward movement to the head when the taps have reached a prescribed depth.

38. In a machine of the character described, and in combination, a column, a head carrying the tool slidable vertically of the column, a rack on the column, a pinion on the head to traverse said rack, means for turning said pinion for moving the head for drilling, said means including a clutch, a second clutch controlling the operation of said pinion, and the feeding movement of said head for tapping, and driving connections to said tapping clutch, and means for shifting one clutch into operation and the other out of operation, and vice versa, both of said clutches traveling with the head.

39. In a machine of the character described, and in combination, a column, a head carrying the tool slidable vertically of the column, a rack on the column, a pinion on the head to traverse said rack, means for turning said pinion for moving the head for drilling, said means including a clutch, a second clutch controlling the operation of said pinion, and the feeding movement of said head for tapping, and driving connections to said tapping clutch, and means for shifting one clutch into operation and the other out of operation, and vice versa, both of said clutches travelling with the head, the driving means of the tapping clutch deriving its power from one of the tool shafts of the head.

40. In a machine of the character described, and in combination, a column, a head carrying the tool slidable vertically of the column, a rack on the column, a pinion on the head to traverse said rack, means for turning said pinion for moving the head for drilling, said means including a clutch, a second clutch controlling the operation of said pinion, and the feeding movement of said head for tapping, and driving connections to said tapping clutch, and means for shifting one clutch into operation and the other out of operation, and vice versa, both of said clutches traveling with the head, the driving means of the tapping clutch including change gears to make the feeding movement of the head accord with the pitch of the thread of the tap.

41. In combination, a head carrying a tapping tool spindle, a drive shaft for said tool spindle, a supporting column for the head, and means for moving the head along the column, including driving connection leading from and driven by the spindle of the tapping tool and arranged off to one side of the drive shaft, substantially as described.

42. In combination, a column, a head carrying a series of tapping tools around its center line, a drive shaft centrally disposed in relation to the head, gearing between said drive shaft and the tool spindles, feed means for moving the head along the column to feed the tapping tools, and connections for driving said feed means, including a shaft extending up from the spindle of one of the tapping tools, off to one side of the center line of said head, a shaft extending down alongside the head and movable therewith, gearing between the upper ends of the said shafts a pinion whose shaft is mounted in the head, and gearing between the lower end of the shaft last mentioned and the pinion shaft, said gearing moving with the head, substantially as described.

43. In combination in a machine of the character described, for drilling and tapping, a column having a rack fixed thereon, a head movable on said column, a pinion having its shaft mounted in the head and engaging the rack, for moving the head along the column, two sets of driving connections for said means, including a clutch in each of said sets one clutch being connected with one end of the pinion shaft and the other clutch being connected with the other end of said shaft, one set of driving connections including reducing gears for drilling, and the other set having change speed gearing for making the feed movement of the head accord with the pitch of the threads of the taps and means for shifting the clutches, one out and the other in simultaneously to make the reduction gearing and the change speed gearing idle alternately, substantially as described.

44. In combination in a machine of the character described, for drilling and tapping, a column provided with a rack, a head movable along the column and having a pinion engaging the rack, said head carrying the rotary tools, and two sets of driving connections to the pinion, one for drilling and the other for tapping, substantially as described.

45. In combination in a machine of the character described, for drilling and tapping, a column provided with a rack, a head movable along the column and having a pinion engaging the rack, said head carrying the rotary tools, and two sets of driving connections to the pinion, one for drilling and the other for tapping, each of said sets including a clutch, reducing gearing between the clutch of the drilling driving connections and the pinion, and a direct connection between the clutch of the tapping driving connections and the pinion, substantially as described.

46. In combination in a machine of the character described, for drilling and tapping, a column provided with a rack, a head movable along the column and having a pinion engaging the rack, said head carrying the rotary tools, and two sets of driving connections to the pinion, one for drilling and the other for tapping, each of said sets including a clutch, reducing gearing between the clutch of the drilling driving connections and the pinion, and a direct connection between the clutch of the tapping driving connections and the pinion, the reducing gearing being connected with one end of the pinion shaft, and the tapping clutch being connected with the other end of said shaft.

47. In combination, a column, a rack secured thereto, a head movable vertically along the rack, a pinion carried on the head and engaging the rack, taps carried by the head, a driving shaft for the taps, a clutch connected to the driving pinion, and change gearing for driving the clutch to make the rate of movement of the head accord with the pitch of the threads of the taps, a driving connection extending to the pinion shaft for drilling, and means for throwing out said clutch when the machine is set for drilling, substantially as described.

48. In combination, a column, a rack secured thereto, a head movable vertically along the rack, a pinion carried on the head and engaging the rack, taps carried by the head, a driving shaft for the taps, a clutch connected to the driving pinion, and change gearing for driving the clutch to make the rate of movement of the head accord with the pitch of the threads of the taps, said change speed gearing being driven from the spindle of one of the taps, carried by the head.

49. In combination, a column, a rack thereon, a head slidable on the column, a pinion carried by the head and engaging the rack, a shaft mounted in the head carrying said pinion, taps carried by the head, a worm wheel coaxially arranged with the pinion and in the pinion shaft, a clutch between the worm wheel and the pinion, said clutch also being arranged on the pinion shaft, a worm meshing with the worm wheel, a gearing for driving the worm to accord with the pitch of the tap threads, a shaft extending vertically alongside the head between the worm and said gearing, said gearing being driven from one of the tap spindles to the head, and means for operating the clutch, substantially as described.

50. In combination, a column, a rack secured thereto, a head slidable along the column, a pinion carried by the head and engaging the rack, a drive connection for the pinion for feeding the head for drilling, including a worm, a worm wheel, and a clutch at one end of the pinion shaft and carried at one side of the head, a driving connection for tapping, including a worm, a worm wheel at the other side of the head, and a clutch for connecting the last mentioned worm wheel with the other end of the pinion shaft, and clutch operating means having connections to both clutches so that when one is thrown into action the other is thrown out of action.

51. In combination, a column having a rack thereon, a head slidably mounted on the column, a pinion on the head engaging the rack, means for giving the head a feeding movement for drilling, means for giving said head a feeding movement for tapping, a hand lever controlling said means, and a lock for the hand lever to hold it in neutral position so that no feed movement of the head can take place, means for preventing the hand lever from moving in one direction while allowing it to move in the other direction for setting one of the clutches for tapping, and means for preventing the hand lever from moving the other way but allowing it to be moved for setting the other clutch for drilling, substantially as described.

52. In combination, a column having a rack thereon, a head slidably mounted on the column, a pinion on the head engaging the rack, means for giving the head a feeding movement for drilling, means for giving said head a feeding movement for tapping, a hand lever controlling said means, and a lock for the hand lever to hold it in neutral position so that no feed movement of the head can take place, means for preventing the hand lever from moving in one direction while allowing it to move in the other direction for setting one of the clutches for tapping, and means for preventing the hand lever from moving the other way but allowing it to be moved for setting the other clutch for drilling, said means consisting of an arm connected with the hand lever, a pair of stops, one on each side of the arm, and a device for setting said stops either both in line with the arm to prevent its movement, or setting either stop in line with the arm and the other out of line with the arm, substantially as described.

53. In combination, a column having a rack, a head slidably mounted on the column, a pinion carried by the head and engaging the rack for feeding the head along the rack, driving means for the pinion, including a clutch for use when drilling, driving means including a second clutch for use when tapping, each of said clutches controlling the operation of the pinion, means for connecting and operating the clutches so that one is thrown out while the other is thrown in, said means including a vertical shaft at each clutch, connecting means between said shafts, including arms, and a link, a lever for operating one of the shafts, an arm on one of the shafts, stops for said arm, a shaft carrying the said stops, and means for setting the last mentioned shaft to hold the stops in any one of a number of positions to hold the arm locked or to allow it to move in either one direction or the other.

54. In combination, a column having a rack, a head slidable on the column, a pinion carried by the head and engaging the rack, and driving means including a clutch for use when drilling, a second driving means including a clutch for use when the machine is tapping, means connecting the clutches to throw one out and the other in, a trip arm for operating the connections, a trip dog for operating the trip arm as the head rises for throwing out the drill clutch, and a trip dog for operating said arm for throwing out the tapping clutch as the head rises, substantially as described.

55. In combination, a column having a rack, a head slidable on the column, a pinion carried by the head and engaging the rack, and driving means including a clutch for use when drilling, a second driving means including a clutch for use when the machine is tapping, means connecting the clutches to throw one out and the other in, a trip arm for operating the connections, a trip dog for operating the trip arm as the head rises for throwing out the drill clutch, and a trip dog for operating said arm for throwing out the tapping clutch as the head rises, and an emergency dog for throwing out the tapping clutch should the operator throw this clutch into action after the trip arm is carried by the movement of the head up past the trip dog controlling the tapping clutch.

56. In combination, a shaft for driving the tools, a casing having bearings for the said shaft, gearing for driving the said shaft, and having a sleeve extending along the shaft, a collar attached to the casing over the end of the shaft and provided with oil wiping grooves extending about the sleeve, said sleeve having a groove located out beyond the oil wiping grooves to collect oil, said collar having a chamber to receive oil thrown off from said groove by centrifugal force, and having an aperture for the discharge of the oil, substantially as described.

57. In a machine of the character described, a shaft, tapping tools driven thereby, reversing gearing for driving the shaft, a main clutch, a lever for controlling the reversing gearing, and means operated by the lever when set in neutral position for releasing the main clutch.

58. In combination in a combined drilling and tapping machine, a column, a head movable vertically of the column, tools carried by the head, a feed shaft with connections to the head for making it traverse the head in drilling, a feed shaft for tapping, a main gear casing at the top of the column, a drive shaft and a transmission shaft in said casing, a vertical shaft for driving the tools, a gear connection between the vertical shaft and the transmission shaft, a supplemental casing, change speed gearing therein for transmitting power from the transmission shaft to the feed shaft of the drilling organization, a second supplemental casing and change speed gearing within the same driven from the drive shaft for imparting varying speeds to the transmission shaft, substantially as described.

59. In combination in a tapping machine, a column, a head traversing the column, a tool carried by the head driving means for the head and tool and means for reversing the drive comprising a spring, shiftable transmission means to be operated by said spring, a lock for the spring to hold it under compression, a trip for said lock which is rendered operative when the tap reaches a certain depth and a hand lever with means operated thereby for reversing the drive or for setting the spring under compression said lock and trip being independent of said hand lever, and holding the spring compressed while reversing is done by the hand lever.

60. In combination in a tapping machine, driving means for rotating and advancing the taps, including an automatically operating device for reversing the driving means, a spring for operating the reversing device, yielding connections between said spring and the reversing device through which the spring operates to reverse the movement, and a lock and trip for said spring operating when a certain depth has been cut, to release the spring.

61. In combination in a tapping machine, a reversing clutch, yielding connections for reversing said clutch, driving means including a main clutch and means for temporarily throwing out the main clutch for the reversing action of the reversing clutch to take place, substantially as described.

62. In a combined drilling and tapping machine, a head carrying the tool, a main driving clutch, reduction gearing between the same and the tap to reduce the velocity thereof, means for advancing the head in accordance with the speed of the taps, means for positively stopping the advance movement of the taps when a prescribed depth has been reached, means for automatically reversing the direction of rotation of the taps and the movement of the head, and means for feeding the head for drilling with clutches one for the feed of the head in drilling and the other for the feed of the head in tapping, and means for simultaneously throwing one clutch out and the other clutch in, substantially as described.

63. In combination with a carrier for the tool, means for moving the same, including a reversing mechanism, a lever for operating said reversing mechanism to change the direction of movement of the carrier, means for locking said mechanism and lever against shifting, a spring for placing said lever under pressure in locked condition, and means for releasing the said lock when the carrier with the tool has reached a certain point in its movement, whereupon said spring will operate the lever and said mechanism to change the direction of movement of the head or carrier automatically.

64. In combination with a carrier for the tool, means for moving the same, including a reversing mechanism, a lever for operating said reversing mechanism to change the direction of movement of the carrier, means for locking said mechanism and lever against shifting, a spring for placing said lever under pressure in locked condition, and means for releasing the said lock when the carrier with the tool has reached a certain point in its movement, whereupon said spring will operate the lever and said mechanism to change the direction of movement of the head or carrier automatically, said releasing means including a member travelling with the head or carrier and having a contact adjustably mounted thereon, substantially as described.

65. In combination with a carrier for the tool, means for moving the same including reversing mechanism to change the direction of said carrier, a lock for holding said reversing mechanism in position when set to drive the carrier in one direction, a spring for applying tension to said reversing mechanism in locked position, and means for automatically releasing the lock when the carrier with the tool has reached a certain point in its movement, substantially as described.

66. In combination with a carrier for the tool, means for moving the same including reversing mechanism to change the direction of said carrier, a lock for holding said reversing mechanism in position when set to drive the carrier in one direction, a spring for applying tension to said reversing mechanism in locked position, and means for automatically releasing the lock when the carrier with the tool has reached a certain point in its movement, said releasing means comprising a contact member movable with the carrier to operate said lock, whereupon the spring will cause the reversing action to be performed.

In testimony whereof, we affix our signatures.

WILLIAM R. FOX.
HOWARD D. CORWIN.